(12) United States Patent
Akanou et al.

(10) Patent No.: US 12,716,274 B2
(45) Date of Patent: Aug. 25, 2026

(54) HANDLE WITH A STRAIN GAUGE MODULE USED AS A SENSOR FOR A CAR DOOR

(71) Applicant: MINEBEA ACCESSSOLUTIONS ITALIA S.P.A., Pianezza (IT)

(72) Inventors: Myriam Akanou, Pianezza (IT); Anthony Guerin, Pianezza (IT); Antonio Labalestra, Pianezza (IT)

(73) Assignee: Minebea AccessSolutions Italia S.p.A., Pianezza (IT)

( * ) Notice: Subject to any disclaimer, the term of this patent is extended or adjusted under 35 U.S.C. 154(b) by 405 days.

(21) Appl. No.: 18/460,405

(22) Filed: Sep. 1, 2023

(65) Prior Publication Data

US 2024/0076912 A1 Mar. 7, 2024

(30) Foreign Application Priority Data

Sep. 2, 2022 (EP) .................................... 22193624

(51) Int. Cl.
*E05B 81/76* (2014.01)
*G01L 1/22* (2006.01)

(52) U.S. Cl.
CPC ............ *E05B 81/76* (2013.01); *G01L 1/2206* (2013.01); *G01L 1/225* (2013.01); *E05Y 2400/44* (2013.01); *E05Y 2900/531* (2013.01)

(58) Field of Classification Search
CPC .......... E05B 81/76; E05B 81/77; E05B 85/10; E05B 79/06; E05Y 2400/44; E05Y 2900/531; G01B 7/18; G01B 7/20; G01B 21/32; G01L 1/2206; G01L 1/225; E05F 15/41; E05F 15/77; Y10T 292/57
USPC ........................................................... 70/237
See application file for complete search history.

(56) References Cited

U.S. PATENT DOCUMENTS 7,357,037 B2 * 4/2008 Hnat ...................... G01D 9/005 73/795
9,151,089 B2 * 10/2015 Aerts .................... E05B 85/107
9,696,839 B1 * 7/2017 Bingle ................ G06F 3/04883
10,267,068 B2 * 4/2019 Van Wiemeersch .... E05B 77/02
(Continued)

FOREIGN PATENT DOCUMENTS

CN 112444333 A * 3/2021 ............... G01L 1/22
CN 118129598 A * 6/2024 ............... G01B 7/18
(Continued)

OTHER PUBLICATIONS

DE102017008340 Espacenet machine translation claims and description (Year: 2025).*
(Continued)

*Primary Examiner* — Steven A Tullia
(74) *Attorney, Agent, or Firm* — Burris Law, PLLC

(57) ABSTRACT

A detection system for a handle of a car access assembly that includes a sensing module and a flexible printed circuit board. The sensing module includes at least one strain gauge having a sensing area and connection points in contact with the sensing area so as to permit the measurement of a signal at the connection points. The flexible printed circuit board has a first end with at least one connection area adapted to be connected to the connection points of the at least one strain gauge and a second end with a connection arrangement configured to be connected to an electronic control unit.

10 Claims, 3 Drawing Sheets

(56) References Cited

U.S. PATENT DOCUMENTS 10,301,855 B2 * 5/2019 Van Wiemeersch .... E05B 85/14
10,948,367 B2 * 3/2021 Steyn .................... H05K 1/028
11,382,208 B2 * 7/2022 Sieg ...................... E05B 81/77
11,542,731 B2 * 1/2023 Leonardi ............... G07C 5/008
11,542,732 B2 * 1/2023 Schatz .................. E05B 85/16
11,848,500 B2 * 12/2023 Yeom ................ H01Q 21/0025
12,000,183 B2 * 6/2024 Sato ...................... E05B 81/77
12,163,780 B2 * 12/2024 Mork ..................... G01B 7/16
12,291,900 B2 * 5/2025 Sato ...................... E05B 85/10
2002/0108310 A1 * 8/2002 Schroer .................. E05F 11/52 49/280
2003/0009855 A1 * 1/2003 Budzynski ............. E05B 81/78 16/443
2003/0132667 A1 * 7/2003 Willats ................... E05B 81/76 70/262
2008/0021619 A1 * 1/2008 Steegmann ............ E05B 81/78 70/276
2014/0069015 A1 * 3/2014 Salter ..................... E05B 81/00 49/31
2014/0292004 A1 * 10/2014 Ruse ...................... E05B 81/78 292/336.3
2015/0035296 A9 2/2015 Aerts et al.
2015/0192482 A1 * 7/2015 Araki .................. G01L 1/2287 73/862.627
2016/0123045 A1 * 5/2016 Bingle ................... E05B 81/04 292/336.3
2016/0251880 A1 * 9/2016 Bingle ................... E05B 81/76 701/49
2016/0355128 A1 * 12/2016 Konchan ................ E05B 81/72
2017/0028907 A1 * 2/2017 Chen ...................... E05B 17/10
2017/0260778 A1 * 9/2017 Witte ................ G07C 9/00174
2017/0370129 A1 * 12/2017 Ring ....................... E05B 81/76
2018/0058837 A1 * 3/2018 Dektor .............. H03K 17/9625
2018/0088837 A1 * 3/2018 Zhou ....................... G06F 3/065
2019/0078359 A1 * 3/2019 Zhang ..................... E05B 77/08
2021/0102415 A1 * 4/2021 Scheibe .................. E05B 81/78
2021/0164281 A1 * 6/2021 Takata .................... E05B 81/77
2023/0032112 A1 * 2/2023 Pokora ..................... G01B 7/18
2023/0079515 A1 3/2023 Sato et al.
2023/0171893 A1 * 6/2023 Lee ...................... H05K 1/0281 361/749
2024/0118147 A1 * 4/2024 Sato ....................... H01H 13/00

FOREIGN PATENT DOCUMENTS

CN 118933471 A * 11/2024 ............ E05B 85/10
DE 10132925 A1 * 1/2003 ............ E05B 81/78
DE 102017008340 A1 * 3/2019 ......... E05B 17/0004
DE 102005061755 B4 * 6/2020 ............ E05B 81/78
EP 1238177 B2 * 3/2009 ............ E05B 85/10
EP 2035771 B1 * 10/2009 .............. G01B 7/16
EP 3088641 A1 * 11/2016 ......... G07C 9/00571
GB 1333167 A * 10/1973 ........... G01M 13/00
GB 2576324 A * 2/2020 ............... B65F 3/00
JP 11311058 A * 11/1999 ............ E05F 15/10
JP 2005098017 A * 4/2005
JP 2007023620 A * 2/2007 ............ E05F 15/14
JP 2008150897 A * 7/2008
JP 2013511635 A * 4/2013 ............ E05B 85/14
JP 2016130392 A * 7/2016
JP 2016138845 A * 8/2016
JP 2024116102 A * 8/2024
KR 20130052113 A * 5/2013 .............. G01B 7/18
KR 20160066878 A * 6/2016 ............ E05B 85/10
KR 20240054592 A * 4/2024 ........... H05K 9/0022
WO WO-9928170 A1 * 6/1999 ............ E05B 85/10
WO WO-03071067 A1 * 8/2003 ............ E05B 81/78
WO WO-2004005872 A2 * 1/2004 ............ G01D 5/183
WO WO-2010105800 A2 * 9/2010 ............ G01L 1/044
WO WO-2012140137 A1 * 10/2012 ............ E05B 81/77
WO WO-2017019760 A1 * 2/2017 ............ E05B 81/77
WO WO-2017133017 A1 * 8/2017 .............. G01L 9/04
WO WO-2018001906 A1 * 1/2018 ............ E05B 81/78
WO WO-2022028193 A1 * 2/2022 .............. G01B 7/18

OTHER PUBLICATIONS

European Search Report issued in corresponding EP Application 22193624, dated Feb. 7, 2023, 3 pages.

* cited by examiner

HANDLE WITH A STRAIN GAUGE MODULE USED AS A SENSOR FOR A CAR DOOR

CROSS-REFERENCE TO RELATED APPLICATIONS

This application claims priority to and the benefit of EP 22193624.8 filed on Sep. 2, 2022. The disclosure of the above application is incorporated herein by reference.

FIELD

The present disclosure relates to a handle with a strain gauge module used as a sensor for triggering the opening of a car door.

BACKGROUND

The statements in this section merely provide background information related to the present disclosure and may not constitute prior art.

A handle adapted to be used for car doors usually includes a mechanical system to release the blocking of the door. Once triggered, the user can freely pull or push the door. An alternative for releasing the blocking of the door is to use an electrical system. Once the blocking is released, the functioning is the same: the user can freely pull or push the door. For example, a strain gauge can act as a sensor to trigger an electrical release of the mechanism blocking the door. A strain gauge is a sensor whose deformation is a function of its electrical resistance when a current is circulating through it.

The use of such a sensor gives satisfaction in that the opening of a car door is easier for the user compared to a mechanical system. Indeed, it suffices to press a part of the handle near the strain gauge module to permit the opening, and there is no need to pull the handle before moving the door.

However, a strain gauge is a small component compared to a car handle and there is a difficulty to correctly wire the strain gauge module when mounted inside the handle and/or car door. Depending on the quality of the mounting, the quality of the signal measured by the strain gauge can vary. Indeed, using typical electrical wires may imply mounting difficulties as there is little space inside the handle for connecting electrical wires that measure a signal.

In particular, a low quality soldering of the wires can lead to a fragile electrical connection. Another problem when implementing a strain gauge in a handle is that the obtained signal can suffer from electrical noise resulting from electromagnetic effects due to other parts constituting the handle or the car door.

Therefore, although the use of a strain gauge for a car door seems appropriate for the user experience, there is still some difficulties to implement such sensors as mounting and obtaining a quality signal are difficult.

The teachings of the present disclosure address these and other issues with implementing such sensors in car handles.

SUMMARY

This section provides a general summary of the disclosure and is not a comprehensive disclosure of its full scope or all of its features.

The present disclosure relates to a detection system adapted for a handle of a car access assembly. The detection system includes a sensing module and a flexible printed circuit board. The sensing module includes at least one strain gauge having a sensing area and connection points in contact with the sensing area so as to permit measurement of a signal at the connection points. The flexible printed circuit board has a first end with at least one connection area adapted to be connected to the connection points of the at least one strain gauge and a second end with a connection arrangement configured to be connected to an electronic control unit.

The use of a flexible printed circuit board as an intermediate element to the electronic control unit is advantageous because it permits the ability to have a good electrical connection to the at least one strain gauge.

Indeed, compared to electrical wires used as intermediate elements, the flexible printed circuit board is configured to establish a reliable connection with the at least one strain gauge.

The flexible printed circuit board is able to be elastically deformed which facilitates the installation inside the handle and/or the car door. In this sense, the term flexible is to be understood as arranged to be elastically deformed without negative consequences on the quality of the current conductivity. This provision permits the ability to easily install the flexible printed circuit board inside the handle and/or car door.

In one form, the strain gauge includes a substrate and a conductive coating defining the sensing area and the two connection points.

In another form, the flexible printed circuit board includes a flexible substrate, for example in plastic, and a conductive layer defining the two connection areas and the connection arrangement. The conductive layer is for example printed on the flexible substrate.

In yet another form, at least one strain gauge may be a full-bridge strain gauge or a half-bridge strain gauge.

In one form, the handle is an outside handle of the car for example on the driver side. As used herein, the term "car" is understood to include every kind of vehicle in the automotive industry including bus, truck, personal vehicles etc.

In another form, the connecting points of the at least one strain gauge and the corresponding connection area of the flexible printed circuit board are configured to be connected by at least two distinct soldering points. This provision permits the ability to have a better connection as there are several soldering points. For comparison, each soldering point is equivalent to an electrical wire soldered to the strain gauge and then connected to the electronic control unit. Using a unique part, i.e., the flexible printed circuit board, simplifies the management of the electrical connection, especially when two strain gauges are used.

In yet another form, the connecting points of the at least one strain gauge and the corresponding connection area of the flexible printed circuit board are configured to be connected by three distinct soldering points. An improved detection system is obtained when using a total of three conductive fixations per strain gauge.

In one form, the flexible printed circuit board presents at least one fold defining a three dimensional path between the first end and the second end. In other words, the flexible circuit board is substantially planar and the at least one fold is dimensioned for defining different portions of the flexible printed circuit board that are angled with respect to each other. It permits an easy insertion of the detection system within the access assembly of the car.

In another form, the sensing module includes a support and two distant strain gauges attached to the support. The first end of the flexible printed circuit board has two branches, each branch having a connection area adapted to be connected to the connection points of the corresponding strain gauge.

The construction is advantageous because the flexible printed circuit board can present a shape that is adapted to the geometry of the inside of the handle and/or car door. In one form, the support is made of a metal material.

In another form, the support is substantially planar and has at least one attaching portion configured to be secured on the handle and/or the car door so as to permit the at least one strain gauge to detect a pushing constraint applied on the handle and a pulling constraint applied on the handle.

The support facilitates the installation of the at least one strain gauge since the detection system is configured to be installed as a whole inside the handle and/or car door, the flexible printed circuit board being fixed to the sensing module beforehand.

In yet another form, the at least one strain gauge is configured to detect a compression constraint and an extension constraint applied transversally to an extension plane of the support.

In one form, the at least one attaching portion is an orifice or a slot configured for receiving a screw, for example with mounting ring(s). In one form, the support may optionally have two attaching portions, the strain gauges being located between the two attaching portions according to a longitudinal direction of the support.

In another form, the detection system also includes the electronic control unit. The electronic control unit includes a connector configured to cooperate with the connection arrangement of the second end and including a rigid printed circuit board configured to track measurements from the at least one strain gauge.

This provision permits the ability to have a flexible printed circuit board that serves as a transmission part. The analyzing functions being realized by the rigid printed circuit board. Moreover, the size of the flexible printed circuit board can be very short between the sensing module and the electronic control unit to limit the electrical noise.

In yet another form, the connector is attached to the rigid printed circuit board.

In one form, the electronic control unit includes an encapsulating box including the rigid printed circuit board and the connector. The encapsulating box being provided with an inlet through opening adapted to receive the second end of the flexible printed circuit board and an outlet through opening adapted to receive an external linking cable configured to be connected to the rigid printed circuit board inside the encapsulating box.

This provision permits the ability to have an isolated electronic control unit dedicated to the measurements management of the sensing module. The measurements can be accurate as the electronic control unit can be located close to the sensing unit, thus reducing the size of the flexible printed circuit board.

In another form, the electronic control unit is potted in the encapsulating box.

The provision improves the insulation of the rigid printed circuit board and the connections with the flexible printed circuit board and the external linking cable. The external linking cable includes for example several electric wires.

In yet another form, the detection system also includes an additional sensor provided with a linking element to the electronic control unit or to the flexible printed circuit board.

This provision permits the ability to take the opportunity of having an electronic control unit to integrate the additional sensor. The additional sensor can be connected to the electronic control unit separately from the flexible printed circuit board or by using the latter.

In one form, the additional sensor uses a near field communication protocol and is intended to be integrated in the handle and/or car door to detect a user complementary device in proximity.

In another form, the detection system includes several sensing modules and several corresponding flexible printed circuit boards adapted to cooperate with the electronic control unit. A unique electronic control unit can be provided to measure data from several sensing modules to improve the detection of a user pushing or pulling the handle.

The present disclosure also discloses a car access assembly that includes the car door and the handle mounted on the car door. The car access assembly also includes a detection system as described above wherein the detection system is configured to be installed in the handle and/or the car door so as to be biased when a pulling or pushing constraint is applied to the handle transversally to an extension plane of the support. In one form, the support may optionally be in contact with a part of the door and with a part of the handle so that the strain gauges are able to detect and differentiate a pulling constraint and a pushing constraint. The different aspects defined above that are not incompatible can be combined.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The invention will be better understood with the aid of the detailed description that is set out below with reference to the appended drawing in which.

Figure 1:
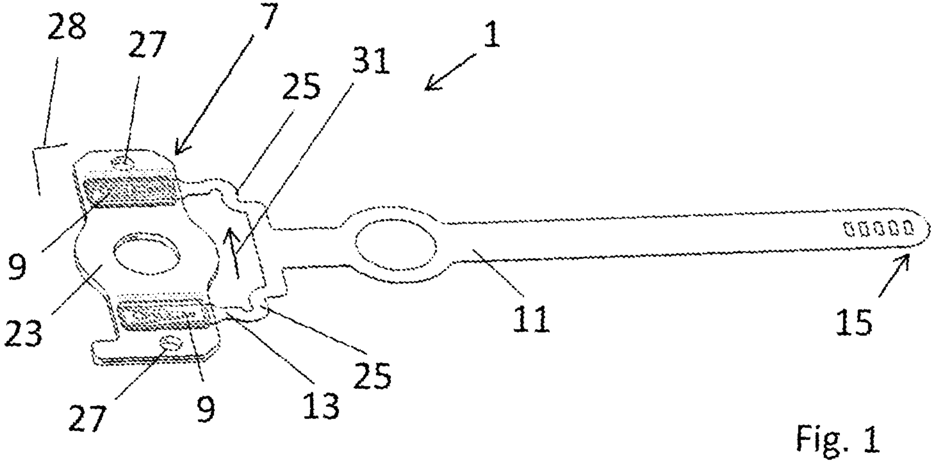
FIG. 1 is a perspective view of a detection system including a sensing module and flexible printed circuit board according to the principles of the present disclosure.
Figure 2:
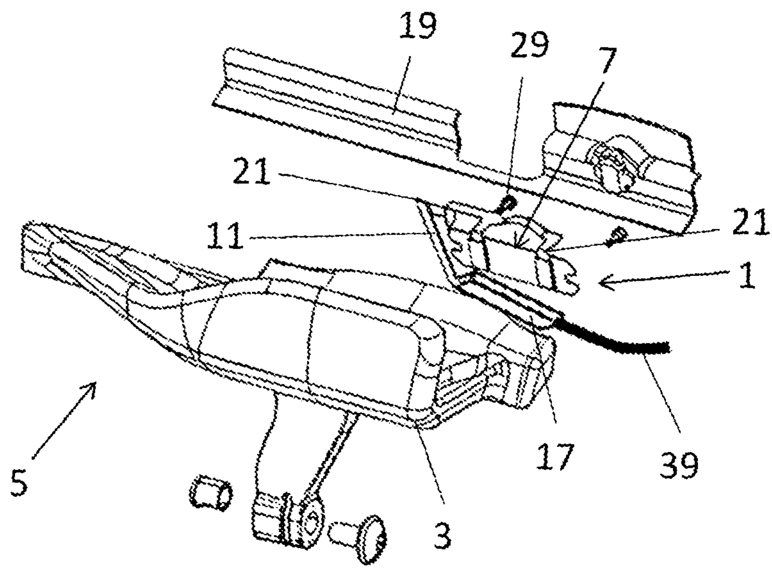
FIG. 2 is an exploded perspective view of an access assembly of a car partially represented and the detection system of FIG. 1.
Figure 3:
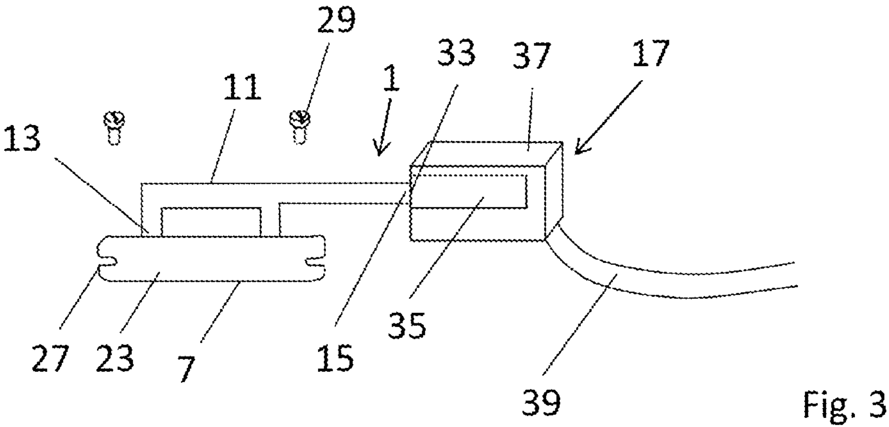
FIG. 3 is a schematic perspective view of the detection system of FIG. 1.
Figure 4:
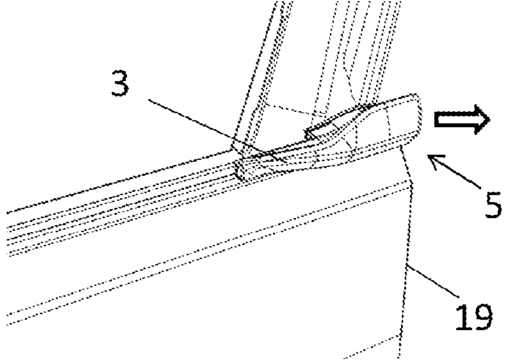
FIG. 4 is a perspective view of the access assembly of FIG. 2, illustrated as being pulled by a user.
Figure 5:
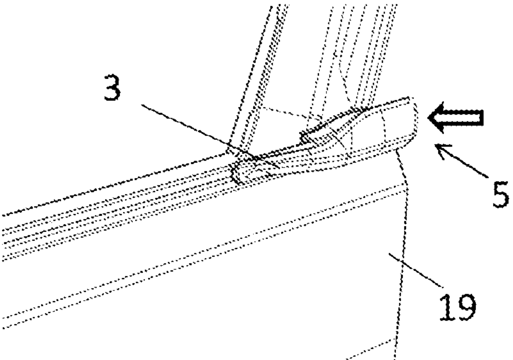
FIG. 5 is a perspective view of the access assembly of FIG. 2, illustrated as being pushed by the user.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description of the figures defined above, the same elements or the elements that are fulfilling identical functions may retain the same references so as to simplify the understanding of the invention.

As illustrated in FIGS. 1 to 5, there is depicted a detection system 1 adapted for a handle 3 of a car access assembly 5.

The detection system 1 includes a sensing module 7 including at least one strain gauge 9 having a sensing area and connection points in contact with the sensing area so as to permits measurement of a signal at the connection points.

The detection system 1 also includes a flexible printed circuit board 11 presenting a first end 13 with at least one connection area adapted to be connected to the connection points of the at least one strain gauge 9 and a second end 15 with a connection arrangement configured to be connected to an electronic control unit 17.

The flexible printed circuit board 11 is able to be elastically deformed which facilitates the installation inside the handle 3 and/or a car door 19. In this sense, the term flexible is to be understood as arranged to be elastically deformed without negative consequences on the quality of the current conductivity or structure integrity.

The strain gauge 9 includes a substrate and a conductive coating defining the sensing area and the two connection points.

The flexible printed circuit board 11 includes a flexible substrate, for example made of plastic, and a conductive layer defining the two connection areas and the connection arrangement. The conductive layer is for example printed on the flexible substrate. At least one strain gauge 9 may be a full-bridge strain gauge or a half-bridge strain gauge.

The handle 3 is an outside handle of the car for example on the driver side. As used herein, the term "car" is understood to include every kind of vehicle in the automotive industry including bus, truck, personal vehicles etc.

The connecting points of the at least one strain gauge 9 and the corresponding connection area of the flexible printed circuit board 11 are configured to be connected by at least two distinct soldering points.

Here, the connecting points of the at least one strain gauge 9 and the corresponding connection area of the flexible printed circuit board 11 are configured to be connected by three distinct soldering points. An improved detection system is obtained when using a total of three conductive fixations per strain gauge 9.

The flexible printed circuit board 11 has at least one fold 21 defining a three dimensional path between the first end 13 and the second end 15.

In other words, the flexible printed circuit board 11 is substantially planar and the at least one fold 21 is dimensioned for defining different portions of the flexible printed circuit board 11 that are angled with respect to each other. It permits an easy insertion of the detection system 1 within the car access assembly 5.

The sensing module 7 includes a support 23 and two distant strain gauges 9 attached to the support 23. The first end 13 of the flexible printed circuit board 11 presenting two branches 25, each branch 25 having a connection area adapted to be connected to the connection points of the corresponding strain gauge 9.

The flexible printed circuit board 11 has a shape that is adapted to the geometry of the inside of the handle 3 and/or car door 19. The support 23 is made of a metal material.

The support 23 is substantially planar and presents at least one attaching portion 27 configured to be secured on the handle 3 and/or the car door 19 so as to permits the strain gauges 9 to detect a pushing constraint applied on the handle and a pulling constraint applied on the handle transversally to the support 23.

Figure 6:
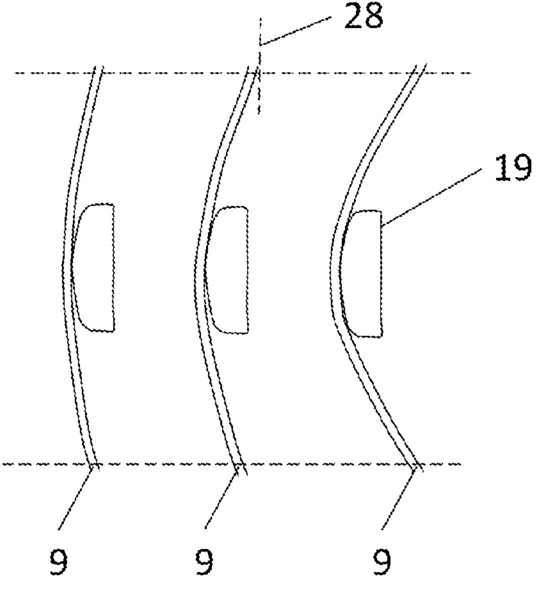
FIG. 6 is a schematic view of the sensing module of FIG. 1, illustrated as comparing the sensing module when it is pulled by the user, pushed by the user and in absence of any stress.

As illustrated in FIG. 6, the at least one strain gauge 9 is configured to detect a compression constraint (on the right) and an extension constraint (on the left) applied transversally to an extension plane 28 of the support 23. In the middle is depicted a state without any constraint. At least one attaching portion 27 is an orifice or a slot configured for receiving a screw 29, for example with mounting ring(s).

The support 23 has two attaching portions 27, the strain gauges 9 being located between the two attaching portions 27 according to a longitudinal direction 31 of the support 23.

The detection system 1 also includes the electronic control unit 17. The electronic control unit 17 includes a connector 33 configured to cooperate with the connection arrangement of the second end 15 and including a rigid printed circuit board 35 configured to track measurements from the strain gauges 9. The connector 33 is attached to the rigid printed circuit board 35.

The electronic control unit 17 includes an encapsulating box 37 including the rigid printed circuit board 35 and the connector 33. The encapsulating box 37 being provided with an inlet through opening adapted to receive the second end 15 of the flexible printed circuit board 11 and an outlet through opening adapted to receive an external linking cable 39 configured to be connected to the rigid printed circuit board 35 inside the encapsulating box 37. The electronic control unit 17 is potted in the encapsulating box 37.

The provision improves the insulation of the rigid printed circuit board 35 and the connections with the flexible printed circuit board 11 and the external linking cable 39. The external linking cable 39 includes for example several electric wires.

Figure 7:
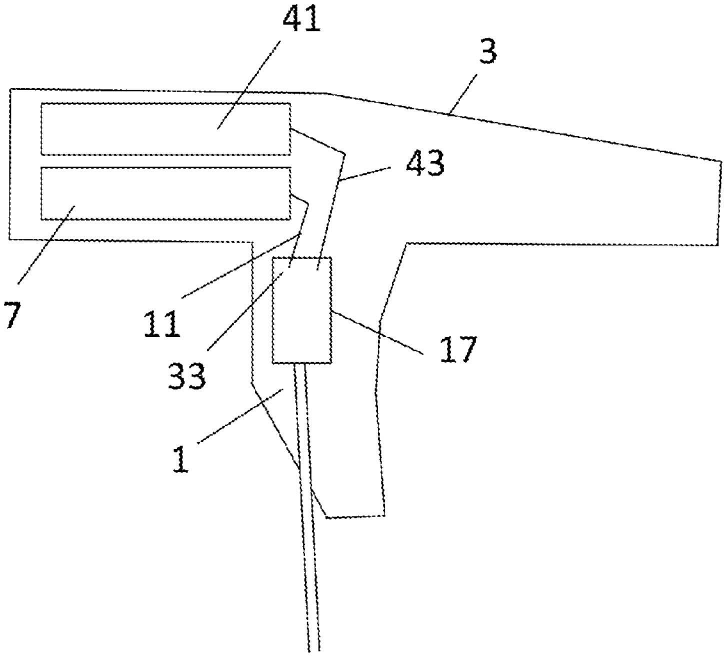
FIG. 7 is a schematic view of the detection system of FIG. 1 including an additional sensor according to the principles of the present disclosure.

As illustrated in FIG. 7, the detection system 1 also includes an additional sensor 41 provided with a linking element 43 to the electronic control unit 17. This provision permits the ability to take the opportunity of having an electronic control unit 17 to integrate the additional sensor 41. The additional sensor 41 can be connected to the electronic control unit 17 separately from the flexible printed circuit board.

The additional sensor 41 uses a near field communication protocol and is configured to be integrated in the handle 3 and/or car door 19 to detect a user complementary device in proximity. The detection system 1 may also include several sensing modules 7 and several corresponding flexible printed circuit board 11 adapted to cooperate with the electronic control unit 17. A unique electronic control unit 17 can be provided to measure data from several sensing modules 7 to improve the detection of a user pushing or pulling the handle 3.

The present disclosure also discloses a car access assembly 5 including the car door 19 and the handle 3 mounted on the car door 19. The car access assembly 5 also includes a detection system 1 as described above wherein the detection system 1 is configured to be installed in the handle 3 and/or the car door 19 so as to be biased when a pulling or pushing constraint is applied to the handle 3 transversally to an extension plane 28 of the support 23, i.e. transversally to the car door 19. The support 23 is in contact with a part of the door and with a part of the handle 3 so that the strain gauges 9 are able to detect and differentiate a pulling constraint and a pushing constraint.

From the above description, it appears that the use of a flexible printed circuit board 11 as an intermediate element to the electronic control unit 17 is advantageous because it permits the ability to have a good electrical connection to the at least one strain gauge 9.

Indeed, compared to electrical wires used as intermediate elements, the flexible printed circuit board 11 is configured to establish a reliable connection with the at least one strain gauge 9. The present disclosure is not limited to the sole embodiment described above by way of example, it encompasses all the variants. Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A detection system for a handle of a car access assembly, the detection system comprising:

a sensing module including at least one strain gauge having a sensing area and connection pads in contact with the sensing area so as to permit measurement of a signal at the connection pads; and a flexible printed circuit board having a first end with at least one connection area adapted to be connected to the connection pads of the at least one strain gauge and a second end with a connection arrangement configured to be connected to an electronic control unit, wherein the sensing module includes a support and two distant strain gauges attached to the support, the first end of the flexible printed circuit board has two branches, each branch having a connection area adapted to be connected to the connection pads of the at least one strain gauge.

2. The detection system according to claim 1, wherein the connection pads of the at least one strain gauge and the at least one connection area of the flexible printed circuit board are configured to be connected by at least two distinct solder joints.

3. The detection system according to claim 2, wherein the connection pads of the at least one strain gauge and the at least one connection area of the flexible printed circuit board are configured to be connected by three distinct solder joints.

4. The detection system according to claim 1, wherein the flexible printed circuit board has at least one fold defining a three dimensional path between the first end and the second end.

5. The detection system according to claim 1, wherein the support is substantially planar and has at least one attaching portion configured to be secured on the handle so as to permit the two distant strain gauges to detect a pushing constraint applied on the handle and a pulling constraint applied on the handle.

6. A detection system for a handle of a car access assembly, the detection system comprising:

a sensing module including at least one strain gauge having a sensing area and connection pads in contact with the sensing area so as to permit measurement of a signal at the connection pads:

an electronic control unit; and a flexible printed circuit board having a first end with at least one connection area adapted to be connected to the connection pads of the at least one strain gauge and a second end with a connection arrangement configured to be connected to the electronic control unit, wherein the electronic control unit comprises an encapsulating box, the encapsulating box comprising a connector configured to cooperate with the connection arrangement of the second end, a rigid printed circuit board configured to track measures from the at least one strain gauge, an inlet through opening adapted to receive the second end of the flexible printed circuit board, and an outlet through opening adapted to receive an external linking cable configured to be connected to the rigid printed circuit board inside the encapsulating box.

7. The detection system according to claim 6, wherein the electronic control unit is potted in the encapsulating box.

8. The detection system according to claim 6, further comprising an additional sensor provided with a linking element to the electronic control unit or to the flexible printed circuit board.

9. The detection system according to claim 6, further comprising several sensing modules and several corresponding flexible printed circuit boards adapted to cooperate with the electronic control unit.

10. A car access assembly comprising a car door, a handle mounted on the car door, and the detection system according to claim 6, wherein the detection system is configured to be installed in the handle so as to be actuated when a user is applying a pulling or pushing constraint to the handle transversally to an extension plane of a support.

* * * * *